(12) United States Patent
Kim et al.

(10) Patent No.: US 8,522,103 B2
(45) Date of Patent: Aug. 27, 2013

(54) METHOD AND APPARATUS FOR CONTROLLING RETRANSMISSION

(75) Inventors: Sung Kyung Kim, Daejeon (KR); Kwang Jae Lim, Daejeon (KR); Sung Cheol Chang, Daejeon (KR); Chul Sik Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 207 days.

(21) Appl. No.: 12/991,282

(22) PCT Filed: May 6, 2009

(86) PCT No.: PCT/KR2009/002375
§ 371 (c)(1),
(2), (4) Date: Nov. 5, 2010

(87) PCT Pub. No.: WO2009/136730
PCT Pub. Date: Nov. 12, 2009

(65) Prior Publication Data
US 2011/0126069 A1  May 26, 2011

(30) Foreign Application Priority Data

| May 6, 2008 | (KR) | 10-2008-0041983 |
| Sep. 5, 2008 | (KR) | 10-2008-0087911 |
| Apr. 21, 2009 | (KR) | 10-2009-0034637 |

(51) Int. Cl.
*H04L 1/18* (2006.01)
(52) U.S. Cl.
USPC .......................... 714/748; 714/762

(58) Field of Classification Search
USPC ................ 714/748, 749, 750, 751, 761, 762; 370/474, 473, 328, 341
See application file for complete search history.

(56) References Cited

U.S. PATENT DOCUMENTS

| 7,050,397 | B2 | 5/2006 | Cheng et al. |
| 7,631,239 | B2 | 12/2009 | Yeo et al. |
| 7,633,863 | B2 | 12/2009 | Kim et al. |
| 7,761,767 | B2 | 7/2010 | Chandra et al. |
| 7,773,524 | B2 | 8/2010 | Lim et al. |
| 7,855,970 | B2 | 12/2010 | Yeo et al. |
| 7,957,360 | B2 * | 6/2011 | Suzuki et al. ............. 370/341 |
| 8,006,158 | B2 | 8/2011 | Kim et al. |

(Continued)

FOREIGN PATENT DOCUMENTS

| CN | 2852545 Y | 12/2006 |
| CN | 1914846 A | 2/2007 |

(Continued)

OTHER PUBLICATIONS

International Search Report dated Nov. 25, 2011 issued in corresponding International Patent Application No. PCT/KR2009/002375.

(Continued)

*Primary Examiner* — Fritz Alphonse
(74) *Attorney, Agent, or Firm* — Staas & Halsey LLP (57) ABSTRACT

A method of controlling retransmission in a transmitter, the method provides transmitting a medium access control (MAC) management message to a receiver by hybrid automatic retransmit request (HARQ) and initiating retransmission of the MAC management message when an HARQ process is terminated with an unsuccessful transmission of the MAC management message before an expiration of a retransmission timer for the MAC management message.

15 Claims, 8 Drawing Sheets

(56) References Cited

U.S. PATENT DOCUMENTS

| | | | |
|---|---|---|---|
| 8,254,315 B2 * | 8/2012 | Suzuki et al. | 370/329 |
| 8,300,663 B2 * | 10/2012 | Chion et al. | 370/474 |
| 2003/0210669 A1 | 11/2003 | Vayanos et al. | |
| 2004/0037224 A1 | 2/2004 | Choi et al. | |
| 2006/0062173 A1 | 3/2006 | Cheng et al. | |
| 2007/0168827 A1 | 7/2007 | Lohr et al. | |
| 2007/0177630 A1 * | 8/2007 | Ranta et al. | 370/473 |
| 2007/0211660 A1 | 9/2007 | Teague | |
| 2007/0214399 A1 | 9/2007 | Lim et al. | |
| 2008/0043619 A1 * | 2/2008 | Sammour et al. | 370/231 |
| 2009/0092077 A1 * | 4/2009 | Pirskanen et al. | 370/328 |

FOREIGN PATENT DOCUMENTS

| | | |
|---|---|---|
| CN | 1992608 A | 7/2007 |
| CN | 101068137 A | 11/2007 |
| CN | 101132262 A | 2/2008 |
| EP | 1843504 A2 | 10/2007 |
| EP | 1 919 114 A1 | 5/2008 |
| JP | 11-32077 | 2/1999 |
| JP | 2006-87120 | 3/2006 |
| JP | 2007-28638 | 2/2007 |
| JP | 2007-281808 | 10/2007 |
| JP | 2007-531335 | 11/2007 |
| KR | 10-2007-0082872 | 8/2007 |
| KR | 10-2007-0093658 | 9/2007 |
| KR | 10-2008-0003682 | 1/2008 |
| KR | 10-2008-0039242 | 5/2008 |
| WO | 2005/064840 A1 | 7/2005 |
| WO | 2006/020520 A2 | 2/2006 |
| WO | 2006/098538 A1 | 9/2006 |
| WO | 2007/050231 A2 | 5/2007 |
| WO | 2007/108656 A1 | 9/2007 |

OTHER PUBLICATIONS

Yih-Shen Chen et al., "Reliable Transmission for Critical MAC Management Messages", IEEE 802.16 Broadband Wireless Access Working Group, Mar. 2008, 5 pages.

Samsung, "HARQ assisted ARQ operation", 3GPP TSG-RAN2 Meeting #49, Nov. 2005, 4 pages.

3GPP TSG-RAN WG2#61; Local NACK and HARQ-ARQ Interaction; NEC; Sorrento, Italy; Feb. 11-15, 2008; 2 pages.

3GPP TSG-RAN WG2# Meeting #55; ARQ operation with HARQ-ARQ interaction; Nokia; Seoul, Korea; Oct. 9-13, 2006; 1 page.

* cited by examiner

METHOD AND APPARATUS FOR CONTROLLING RETRANSMISSION

CROSS REFERENCE TO RELATED APPLICATIONS

This application claims the benefit under 35 U.S.C. Section 371, of PCT International Application No. PCT/KR2009/002375, filed May 6, 2009, which claimed priority to Korean Application No. 10-2008-0041983, filed May 6, 2008, Korean Application No. 10-2008-0087911, filed Sep. 5, 2008, and Korean Application No. 10-2009-0034637, filed Apr. 21, 2009, in the Korean Patent Office, the disclosures of which are hereby incorporated by reference.

TECHNICAL FIELD

The present invention relates to a retransmission control method and apparatus.

BACKGROUND ART

Retransmission methods of a wireless communication system exemplarily include a hybrid automatic retransmit request (HARQ) scheme for using combining a retransmitting scheme in a media access control (MAC) and link performance in a physical (PHY) layer link performance. The HARQ scheme restores received data by combining the transmitted data's receiving information and retransmitted data. The HARQ method includes a synchronous scheme and an asynchronous scheme.

Since the synchronous HARQ scheme generates retransmission in a predetermined time interval in, it needs no retransmission information or less information thereof to reduce an overhead of a downlink control signal. In addition, since the synchronous HARQ scheme efficiently controls a sleep mode, it is easy to reduce power consumption. However, since the synchronous HARQ scheme limits dynamic allocation for radio resources, it gives poor dynamic scheduling gain. On the contrary, the asynchronous HARQ scheme allows dynamic scheduling, and so the scheduling gain is increased but the allocation overhead occurs.

When an HARQ feedback channel is a physical channel in the HARQ process, a cyclic redundancy checking (CRC) of the MAC layer may not be used. In this case, the HARQ feedback channel may generate an error. That is, when a terminal transmits a negative acknowledge (NAK) through a feedback channel in the downlink HARQ data transmission process, a base station may mistakenly receives it as an acknowledge (ACK) to generate a NAK to ACK error. The NAK to ACK error may cause data loss or may generate a long delay until a transmitting side recognizes it and retransmits data.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

Embodiments of the present invention provide an efficient retransmission control method and apparatus.

Technical Solution

An embodiment of the present invention provides a method of controlling retransmission in a transmitting side. The method includes performing an HARQ process by transmitting an HARQ burst to a receiving side, terminating the HARQ process for the HARQ burst with unsuccessful transmission of the HARQ burst, and initiating transmission of an automatic retransmit request (ARQ) block corresponding to the HARQ burst as the HARQ process is terminated.

An HARQ transmitting module of the transmitting side may notify an ARQ transmitting module of the transmitting side of the termination of the HARQ process, and the ARQ transmitting module may initiate transmitting the ARQ block Another embodiment of the present invention provides an apparatus for controlling retransmission in a transmitting side. The apparatus includes an HARQ transmitting module configured to perform an HARQ process for transmitting an HARQ burst to a receiving side; and an ARQ transmitting module configured to initiate transmission of an ARQ block corresponding to the HARQ burst when the HARQ process is terminated with unsuccessful transmission of the HARQ burst.

Yet another embodiment of the present invention provides a method of controlling retransmission in a transmitting side. The method includes transmitting a MAC management message to a receiving side by an HARQ scheme, terminating an HARQ process with unsuccessful transmission of the MAC management message while a response timer for the MAC management message is operated, and initiating retransmission of the MAC management message according to termination of the HARQ process while the response timer is operated.

Response timers for different MAC management messages may be different.

Retransmitting of the entire MAC management message may be initiated when the retransmission is initiated.

When the MAC management message is fragmented into a plurality of messages and an HARQ burst of the MAC management message transmitted by the HARQ scheme includes at least one of the plurality of messages, retransmitting for the at least one of the messages that are failed to be transmitted may be initiated.

Yet another embodiment of the present invention provides an apparatus for controlling retransmission in a transmitting side. The apparatus includes an HARQ transmitting module configured to transmit a media access control (MAC) management message to a receiving side by an HARQ scheme, and a MAC message management module configured to initiate retransmission of the MAC management message when the HARQ process is terminated with unsuccessful transmission of the MAC management message while a response timer for the MAC management message is operated.

Yet another embodiment of the present invention provides a method of controlling retransmission in a transmitting side to which a resource is persistently allocated. The method includes initially transmitting an HARQ burst according to a persistent allocation period, receiving a NAK in response to transmission of the HARQ burst, and retransmitting the HARQ burst by an asynchronous HARQ scheme.

Yet another embodiment of the present invention provides a method of controlling retransmission in a transmitting side. The method includes transmitting an HARQ burst to a receiving side according to a synchronous HARQ scheme, performing an operation of retransmitting the HARQ burst N times (where N is an integer greater than 1) after receiving a NAK for the HARQ burst from the receiving side, and retransmitting the HARQ burst to the receiving side according to an asynchronous HARQ scheme after the operation is performed the N times.

MODE FOR THE INVENTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In the specification, a mobile station (MS) may indicate a terminal, a mobile terminal (MT), a subscriber station (SS), a portable subscriber station (PSS), user equipment (UE), and an access terminal (AT), and it may include entire or partial functions of the terminal, the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

A retransmission control method and apparatus according to an embodiment of the present invention will now be described with reference to the drawings.

Figures 1, 2:
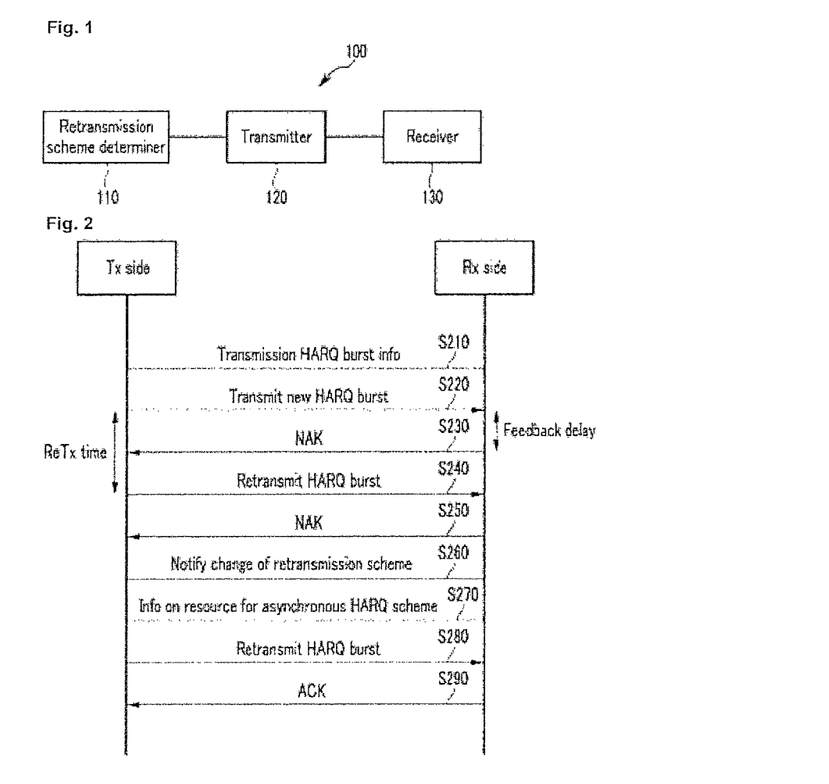
FIG. 1 shows a block diagram of a retransmission control apparatus according to an embodiment of the present invention.
FIG. 2, FIG. 10 and FIG. 11 respectively show a flowchart of a retransmission control method according to an embodiment of the present invention.

FIG. 1 shows a block diagram of a retransmission control apparatus according to an embodiment of the present invention.

Referring to FIG. 1, the retransmission control apparatus 100 of a transmitting side includes a retransmission scheme determiner 110, a transmitter 120, and a receiver 130.

The retransmission scheme determiner 110 determines one of a synchronous retransmission scheme and an asynchronous retransmission scheme as a retransmission scheme. In embodiments, the synchronous HARQ scheme will be described as an example of the synchronous retransmission scheme and the asynchronous HARQ scheme will be described as an example of the asynchronous retransmission scheme.

The receiver 130 receives an ACK or NAK from a receiving side. The transmitter 120 transmits new data to the receiving side when a feedback signal received by the receiver 130 is an ACK, and it transmits retransmission data according to the retransmission scheme determined by the retransmission scheme determiner 110 when the feedback signal received by the receiver 130 is a NAK.

Figure 3:
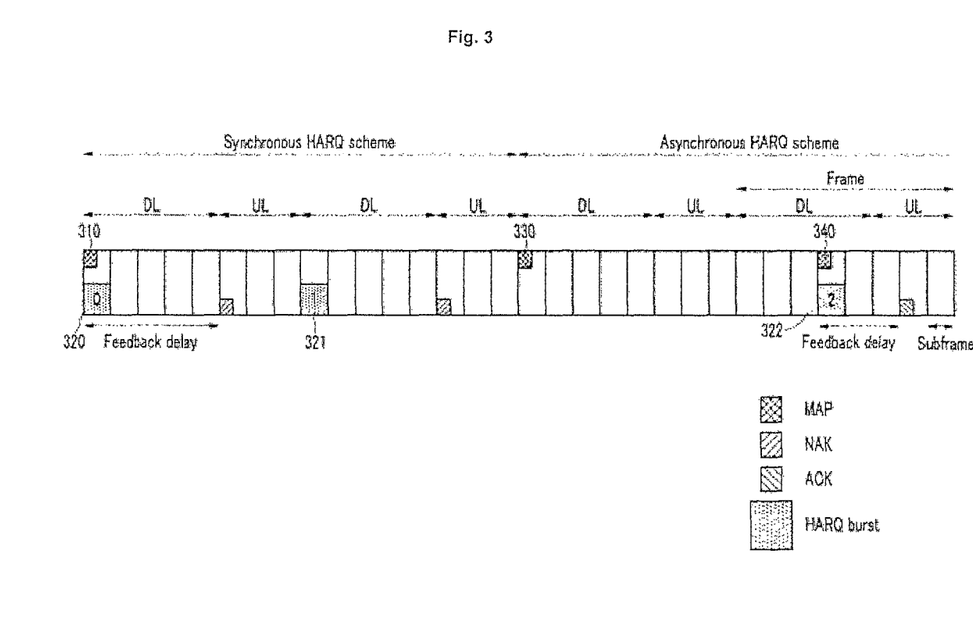
FIG. 3 to FIG. 8 respectively show a retransmission control method according to an embodiment of the present invention.

FIG. 2 shows a flowchart of a retransmission control method according to an embodiment of the present invention. FIG. 3 shows a downlink retransmission control method according to an embodiment of the present invention, and FIG. 4 shows an uplink retransmission control method according to an embodiment of the present invention.

Referring to FIG. 2, the transmitting side and the receiving side check information of the HARQ burst (packet) to be transmitted through a MAP (S210). When the HARQ burst to be transmitted is a downlink burst, the transmitting side is a base station and the receiving side is a terminal. When the HARQ burst to be transmitted is an uplink burst, the transmitting side is a terminal and the receiving side is a base station.

Figure 4:
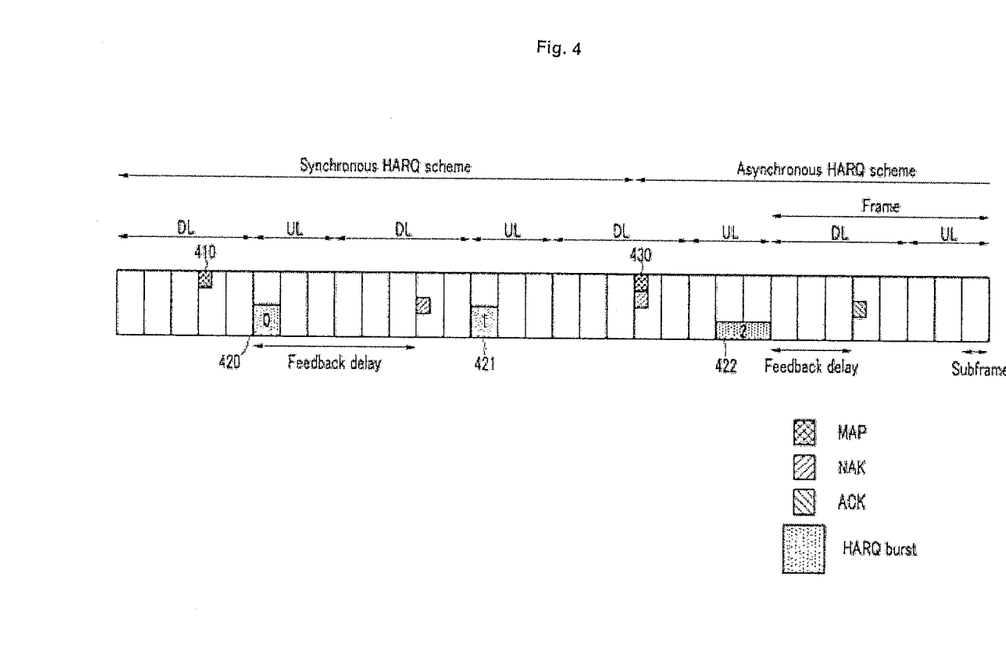

As shown in FIG. 3 and FIG. 4, an example of a frame used for transmission between the transmitting side and the receiving side includes a plurality of subframes (e.g., 8 subframes). Some subframes (e.g., 5 subframes) may be downlink subframes (DL), and other subframes (e.g., 3 subframes) may be uplink subframes (UL). In this case, the base station transmits HARQ burst information 310/410 to the terminal through the MAP of the downlink subframe. The HARQ burst information 310/410 includes information on the resource to which the HARQ burst to be transmitted is allocated, and may further include a toggle bit for indicating a changed state of the HARQ burst and an HARQ channel identifier. The toggle bit is switched from 0 to 1 or from 1 to 0 each the transmitting side transmits a new HARQ burst.

Referring to FIG. 2 again, the transmitting side transmits new HARQ bursts 320 and 420 to the receiving side through the allocated resource (S220). In the case of a downlink burst, as shown in FIG. 3, the base station transmits the HARQ burst 320 to the terminal through the resource allocated to the downlink subframe (e.g., the first subframe). In the case of an uplink burst, as shown in FIG. 4, the terminal transmits the HARQ bursts 420 to the base station through the resource allocated to the uplink subframe (e.g., the sixth subframe). In this case, the HARQ burst 320/420 may be provided through the same frame as the HARQ burst information 310/410 or another frame.

When failing to normally receive the HARQ burst 320/420 from the allocated resource, the receiving side transmits a NAK as a feedback signal to the transmitting side after a feedback delay time has passed (S230). That is, in the case of the downlink burst, as shown in FIG. 3, the terminal transmits the NAK to the base station through a feedback channel after the feedback delay time (e.g., 5 subframes) has passed. In the case of the uplink burst, as shown in FIG. 4, the base station transmits the NAK to the terminal through the feedback channel after the feedback delay time (e.g., 6 subframes) has passed.

When receiving the NAK, the transmitting side retransmits an HARQ burst 321/421 to the receiving side after a retransmission time has passed from the HARQ burst transmitting time (S240). In this case, the transmitting side may retransmit the HARQ burst by using the allocated resource defined in the HARQ burst information 310/410. That is, in the case of the downlink burst, as shown in FIG. 3, the base station retransmits the HARQ burst 321 to the terminal through the resource allocated to the same subframe (the first subframe) of the next frame. In the case of the uplink burst, as shown in FIG. 4, the terminal transmits the HARQ burst 421 to the base station through the resource allocated to the same subframe (the sixth subframe) of the next frame.

When failing to normally receive the HARQ bursts 321 and 421, the receiving side transmits a NAK to the transmitting side after the feedback delay time has passed in a like manner of S230 (S250). The receiving side combines the received HARQ bursts and restores the HARQ burst, and the case of "failing to normally receive" represents the case of failing to restoring the HARQ burst. The transmitting side retransmits the HARQ burst to the receiving side each time when receiving the NAK in a like manner of the step S240, and the receiving side transmits the NAK when failing to normally receive the HARQ burst.

When normally receiving the HARQ burst through this process (i.e., when normally restoring the transmitted HARQ burst), the receiving side transmits an ACK to the transmitting side. The base station notifies the terminal of new HARQ burst information, and the transmitting side transmits a new HARQ burst to the receiving side. In this case, the toggle bit included in the new HARQ burst information is switched to another value.

While repeating the steps S240 and S250, the base station may change the retransmission scheme into the asynchronous HARQ scheme and provide indication 330/430 on the change of retransmission scheme to the terminal (S260). For example, the base station may change the retransmission scheme into the asynchronous HARQ scheme so as to acquire the scheduling gain. Accordingly, the base station provides resource information 340/430 allocated for retransmission of the asynchronous HARQ scheme to the terminal through the MAP of the downlink subframe so that the transmitting side and the receiving side may share resource information allocated for the retransmission of the asynchronous HARQ scheme (S270). The resource information 340/430 of allocated for the retransmission may be transmitted when the HARQ burst 322/422 are retransmitted or may be transmitted in advance to the HARQ burst 322/422. As shown in FIG. 4, the indication 430 for the change of retransmission scheme and the information 430 on the allocated resource may be transmitted through the same MAP.

The transmitting side retransmits the HARQ burst 322/422 to the receiving side through the allocated resource (S280). In the case that the receiving side successfully receives the HARQ burst 322/422, the receiving side transmits an ACK to the transmitting side (S290). In the case that the receiving side fails to successfully receive the HARQ burst 322/422 and transmits a NAK, the steps S270 and S280 are repeated.

In this case, when one HARQ burst is normally transmitted, the base station may change the retransmission scheme into the synchronous HARQ scheme again. In addition, the base station may change the retransmission scheme many time while the one HARQ burst is retransmitted, and it may change the retransmission scheme after a plurality of HARQ bursts are normally transmitted.

Further, the base station may notify the terminal of the change of retransmission scheme through the MAP, or it may notify the terminal of the same through an additional physical channel.

The base station may persistently allocate the resource per the terminal periodically. The persistently allocated resource may be used for periodical burst transmission, and may be used to the downlink and the uplink. A retransmission control method in persistent allocation will now be described with reference to FIG. 5 and FIG. 6.

Figure 5:
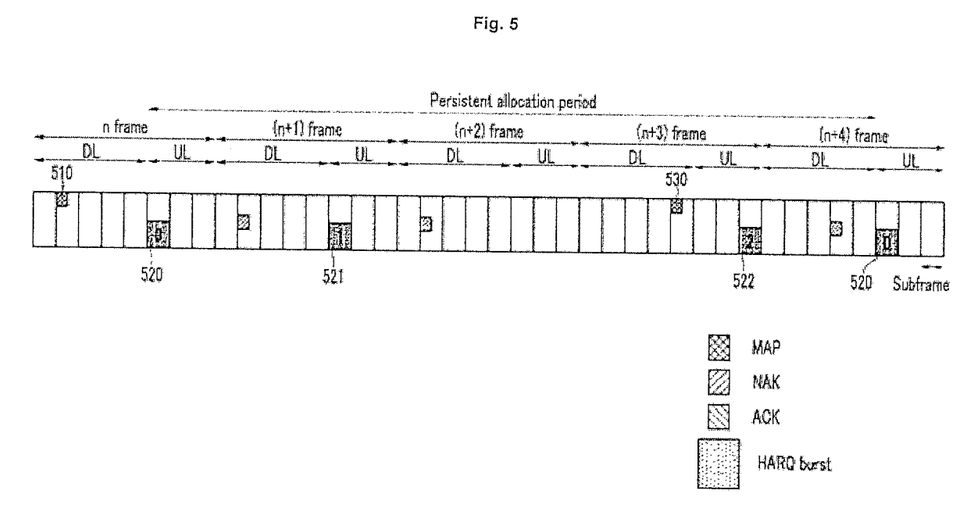
Figure 6:
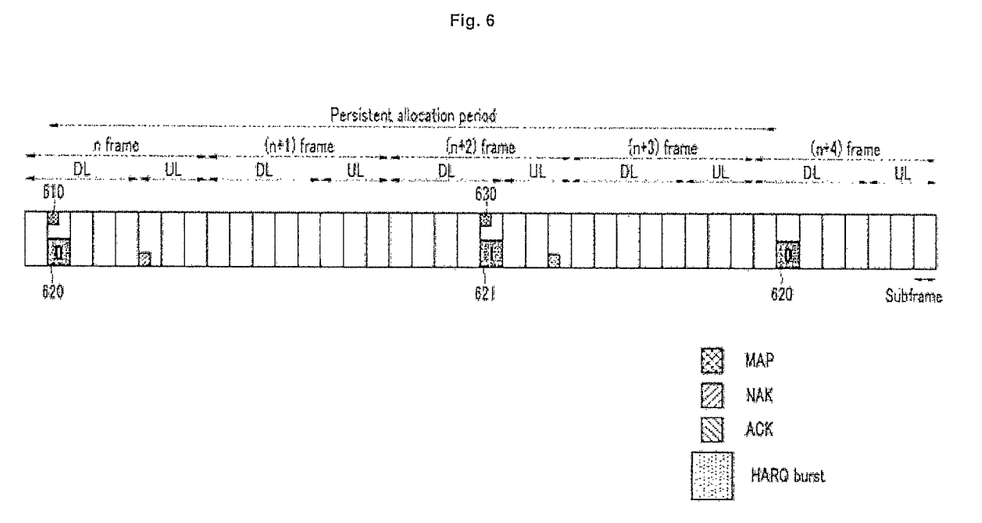

FIG. 5 shows an uplink retransmission control method for persistent allocation according to an embodiment of the present invention, and FIG. 6 shows a downlink retransmission control method for persistent allocation according to an embodiment of the present invention.

Referring to FIG. 5 and FIG. 6, the base station persistently allocates the resource, and provides persistent allocation information 510 and 610 to the terminal through the MAP. The transmitting side (the terminal in FIG. 5 or the base station in FIG. 6) periodically transmits the burst 520/620 to the receiving side (the base station in FIG. 5 or the terminal in FIG. 6) through the persistently allocated resource. For example, when a persistent allocation period is a 4-frame period, the transmitting side periodically transmits the burst 520/620 for each unit of 4 frames [n frame, n+4 frame, . . . ]. When failing to normally receive the HARQ burst 520/620 from the transmitting side, the receiving side transmits a NAK to the transmitting side through the allocated feedback channel.

The transmitting side retransmits an HARQ burst 521 to the receiving side after a retransmission time (e.g., one frame) has passed from the burst transmitting time. When failing to receive the HARQ burst 521, the receiving side transmits a NAK to the transmitting side. When having successfully received the HARQ burst through this process, the receiving side transmits an ACK to the transmitting side.

Since the transmitting side periodically transmits the burst to the receiving side according to the persistent allocation period in the persistent allocation, the retransmission scheme is automatically changed into the asynchronous HARQ scheme after the HARQ burst is retransmitted N times (here, N is an integer greater than 0) according to the synchronous HARQ scheme. In this case, N may be determined such that retransmission of HARQ burst may not collide with the periodical burst transmission caused by the persistent allocation.

Therefore, when the receiving side fails to successfully receive the HARQ burst while the HARQ burst is retransmitted N times (N is 1 in FIG. 5), the base station automatically changes the retransmission scheme into the asynchronous HARQ scheme. Here, since N has already been determined, the base station may not notify the terminal of the change of retransmission scheme. When N is 0 as shown in FIG. 6, the base station changes the retransmission scheme into the asynchronous HARQ scheme without retransmission according to the synchronous HARQ scheme.

The base station provides information 530/630 of the resource allocated for retransmission of the asynchronous HARQ scheme to the terminal through the MAP of the downlink subframe, and the transmitting side transmits an HARQ burst 522/621 to the receiving side through the allocated resource. When successfully receiving the HARQ burst 522/621, the receiving side transmits an ACK to the transmitting side through the allocated feedback channel.

As described above, according to the embodiment of the present invention, since the base station notifies the terminal of the change of retransmission scheme, the synchronous HARQ scheme for reducing the overhead of the downlink control signal and the asynchronous HARQ scheme with good dynamic scheduling gain.

Figure 7:
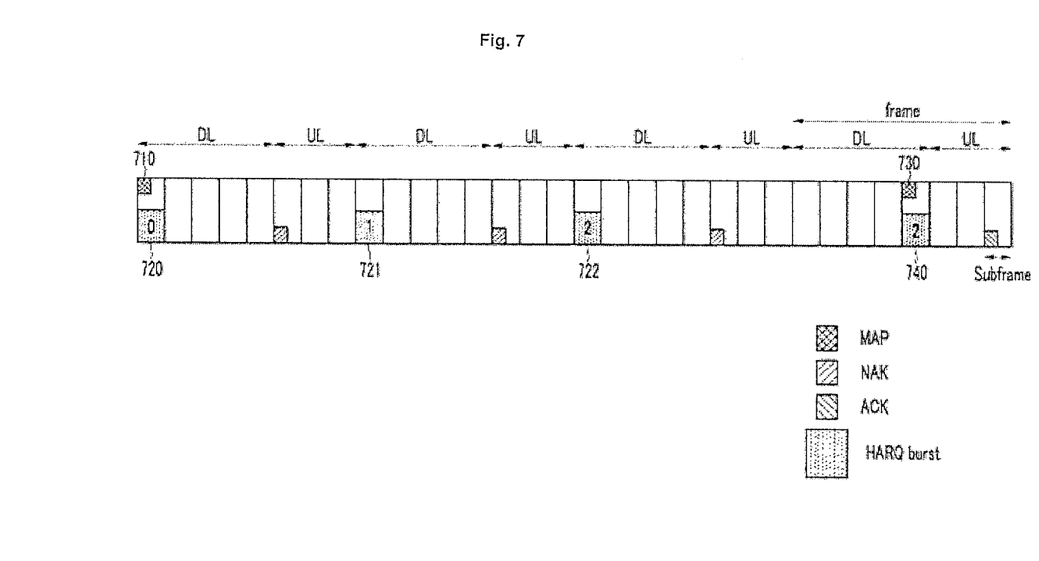
Figure 8:
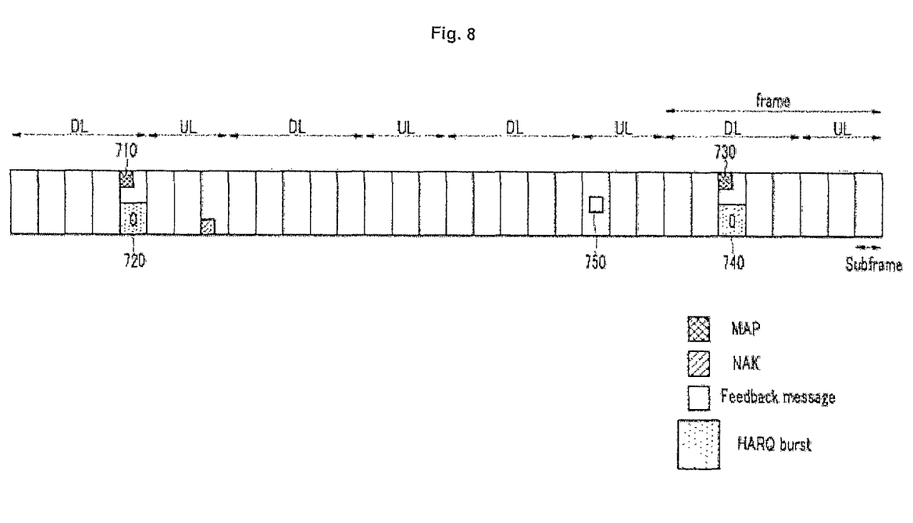

FIG. 7 and FIG. 8 respectively show a retransmission control method according to another embodiment of the present invention.

Referring to FIG. 7, the base station provides information 710 of a new HARQ burst to be transmitted to the terminal through the MAP, and then, the transmitting side transmits the HARQ burst 720. When receiving a NAK from the receiving side, the transmitting side retransmits an HARQ burst 721 to the receiving side. When the maximum retransmission number is determined in the synchronous HARQ scheme, the transmitting side may receive a NAK from the receiving side after having retransmitted HARQ burst 721/722 by the maximum retransmission number (twice in FIG. 7).

The transmitting side retransmits HARQ burst according to an HARQ scheme to the receiving side no longer and discards the corresponding HARQ burst. The transmitting side's data that have been failed in transmission may be transmitted in configuration with a new HARQ burst 740. For this, the base station transmits HARQ burst information (i.e., information on the allocated resource) 730 to the terminal through the MAP so as to transmit the new HARQ burst 740. The transmitting side transmits the new HARQ burst 740 to the receiving side through the allocated resource. Accordingly, the corresponding data can be quickly retransmitted without delay time when transmission failed after the maximum retransmission.

Referring to FIG. 8, when the receiving side fails to receive the HARQ burst from the transmitting side and then transmits a NAK, the transmitting side may mistakenly recognizes the NAK as an ACK and may not retransmit the HARQ burst. That is, an HARQ feedback error such as a NAK to ACK error may occur.

In this case, the receiving side recognizes the NAK to ACK error and transmits a feedback message 750 to the transmitting side. The receiving side may determine it as a NAK to ACK error when another burst is allocated to the resource allocated for transmitting the HARQ burst 720 or when a value acquired by combining the HARQ bursts that failed to be received is less than a threshold value. When the base station can change the retransmission scheme in a like manner of the above-described embodiment, the receiving side may determine the NAK to ACK error when another burst is allocated to the resource allocated for transmitting the HARQ burst 720 while the base station does not change the retransmission scheme. The feedback message 750 may include information on the NAK to ACK error, for example, an HARQ channel identifier of the corresponding HARQ burst, and a subframe (or frame) number for initially transmitting the corresponding HARQ burst.

When receiving the feedback message 750, the transmitting side transmits a new HARQ burst 740 for the erroneous HARQ burst. For this, the base station transmits HARQ burst information 730 to the terminal through the MAP so as to transmit the new HARQ burst 740. The transmitting side transmits the new HARQ burst 740 to the receiving side through the allocated resource.

Accordingly, the HARQ burst can be quickly retransmitted when the NAK to ACK error has occurred.

In FIG. 7 and FIG. 8, the transmitting side may interact with the ARQ process so as to transmit a new HARQ burst for the transmission-failed HARQ burst or the error-generated HARQ burst. When the HARQ and the ARQ are simultaneously applied for data retransmission, the transmitting side searches a ARQ block corresponding to the transmission-failed HARQ burst or the error-generated HARQ burst, and attempts to quickly retransmit the corresponding ARQ block. For this, the transmitting side stores a mapping table that is generated by mapping an HARQ channel identifier and an initial transmission subframe (or frame) number to sequence numbers of a plurality of ARQ blocks. The transmitting side then searches the ARQ block corresponding to the corresponding HARQ burst based on the HARQ channel identifier and the initial transmission subframe (or frame) number of the transmission-failed HARQ burst or the error-generated HARQ burst.

Differing from this, the transmitting side may separately store the HARQ burst to be transmitted by the HARQ scheme, and may newly transmit the transmission-failed HARQ burst or the error-generated HARQ burst without cooperation with the ARQ process.

An embodiment for interaction between the ARQ process and the HARD process will now be described in detail with reference to FIG. 9.

Figure 9:
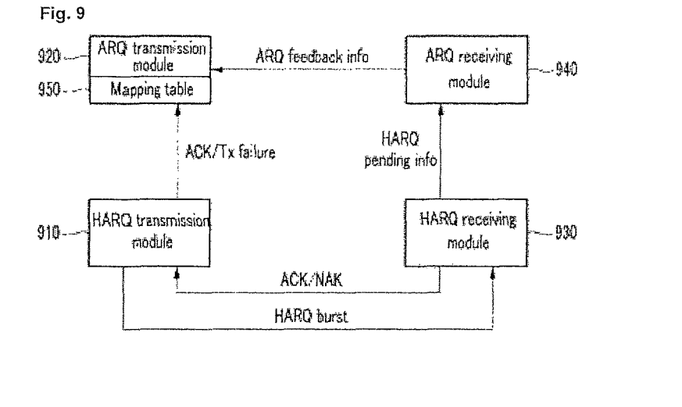
FIG. 9 shows a block diagram of a retransmission control apparatus of a transmitting side and a retransmission control apparatus of a receiving side according to an embodiment of the present invention.

FIG. 9 shows a block diagram of a retransmission control apparatus of a transmitting side and a retransmission control apparatus of a receiving side according to another embodiment of the present invention.

Referring to FIG. 9, the retransmission control apparatus of the transmitting side includes an HARQ transmitting module 910 and an ARQ transmitting module 920, and the receiving side includes an HARQ receiving module 930 and an ARQ receiving module 940. The HARQ transmitting module 910 and the HARQ receiving module 930 are operable in a PHY layer, and the ARQ transmitting module 920 and the ARQ receiving module 940 are operable in a MAC layer. The HARQ transmitting module 910 and the HARQ receiving module 930 control an HARD process, and the ARQ transmitting module 920 and the ARQ receiving module 940 control an ARQ process.

An embodiment for the retransmission control apparatus of the transmitting side to control retransmission will now be described.

The ARQ transmitting module 920 stores a plurality of ARQ blocks to be transmitted by the ARQ scheme, and the HARQ transmitting module 910 transmits the ARQ block provided by the ARQ transmitting module 920 as an HARD burst. In this case, the ARQ transmitting module 920 stores a mapping table 950 generated by mapping the HARQ channel identifiers and the initial transmission subframe (or frame) numbers for the HARD bursts to sequence numbers of the ARQ blocks. Differing from this, the HARQ transmitting module 910 may store the mapping table 950, or the mapping table 950 may be individually maintained and managed within the MAC entity of the transmitting side.

When receiving an ACK from the HARD receiving module 930, the HARQ transmitting module 910 notifies the ARQ transmitting module 920 of it. The ARQ transmitting module 920 refers to the mapping table 950 to check the transmitted ARQ block, and drives an ACK completion timer to discard the successfully transmitted ARQ block after a predetermined time. When the feedback signal has no error or the error is negligible, the ARQ transmitting module 920 may discard the ARQ block without driving the ACK completion timer.

When determining that the HARQ process is finished while the HARQ burst fails to be transmitted, the HARQ transmitting module 910 notifies the ARQ transmitting module 920 of transmission failure of the HARQ burst. For example, when HARQ transmitting module 910 receives a NAK from the HARQ receiving module 930 and the retransmission number reaches the maximum retransmission number, the HARQ transmitting module 910 may determine that the HARQ process is finished while the transmission of HARQ burst is not successful. Also, when receiving a feedback message generated by the NAK to ACK error from the receiving side, the HARQ transmitting module 910 may determine that the HARQ process is finished while the transmission of HARQ burst is not successful.

The ARQ transmitting module 920 recognizes the notification on the transmission failure of the HARQ burst as a NAK of the ARQ scheme, and then initiates retransmitting the ARQ block corresponding to the failed HARQ burst. Hence, the HARD transmitting module 910 retransmits the corresponding ARQ block as a new HARQ burst. In order to check the ARQ block corresponding to the failed HARQ burst, the ARQ transmitting module 920 may refer to the mapping table 950.

An embodiment for a retransmission control apparatus of the receiving side to control retransmission will now be described.

The HARQ receiving module 930 operates the HARQ retransmission timer when it determines that it will wait for retransmission of the HARQ burst when failing to receive the HARQ burst. The HARQ retransmission timer corresponds to the maximum retransmission delay time. The HARQ receiving module 930 may use the HARQ retransmission timer for resetting a buffer resource of the HARQ burst when detecting an HARQ feedback error such as a NAK to ACK error or when transmission of the HARD burst is stopped by an abnormal operation.

The HARQ receiving module 930 transmits HARQ pending information to the ARQ receiving module 940 when retransmission of the HARQ burst is not received until the HARQ retransmission timer is expired (i.e., until it reaches the maximum retransmission delay time). HARQ pending information may include an HARQ channel identifier of the corresponding HARQ burst. In this case, when there exist a plurality of ARQ receiving modules, the HARQ pending information may be transmitted to the corresponding ARQ receiving module 940 through the HARQ channel identifier.

When receiving the HARQ pending message, the ARQ receiving module 940 identifies the ARQ block corresponding to the HARQ channel identifier to transmit ARQ feedback information to the ARQ transmitting module 920. The ARQ feedback information includes information (e.g., identifier) on the failed ARQ block and information on the burst corresponding to the failed ARQ block. The ARQ feedback information may be transmitted in response to the HARQ pending information from the HARQ receiving module 930 or may be transmitted periodically.

In this case, the transmitting sides ACK completion timer and the HARQ retransmission timer may be set with a relation between them.

Further, the ACK completion timer and the ARQ feedback message may be eliminated in a system with no HARQ feedback error or negligible error.

When the retransmission scheme according to the embodiment of the present invention is not the HARQ scheme, the HARQ feedback message may be the PHY layer's feedback message. Also, the retransmission control method according to the embodiment of the present invention may link with the retransmission function block for retransmitting a MAC protocol data unit (PDU) without linkage to the ARQ method. In this case, information (e.g., identifier) of the MAC PDU may be used instead of information of the ARQ block.

As described above, according to the embodiment of the present invention, when the HARQ process is terminated with unsuccessful transmission of the HARQ burst, the data may be quickly retransmitted through retransmitting the ARQ block for the HARQ burst.

An embodiment for controlling retransmission of a MAC management message will now be described with reference to FIG. 10 and FIG. 11.

Figure 10:
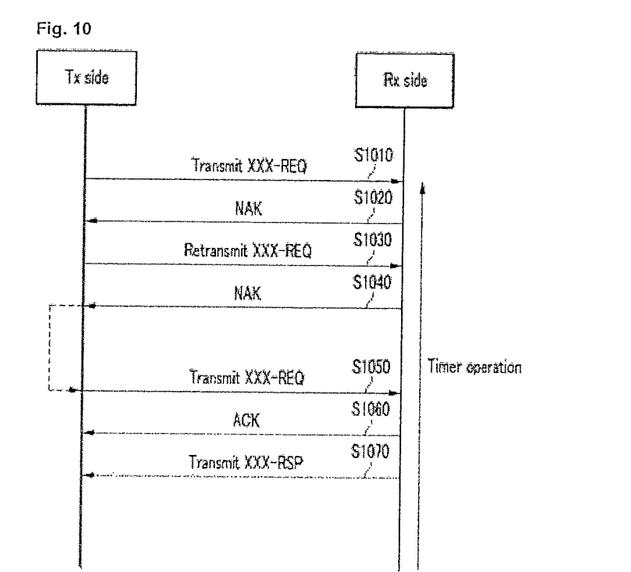
Figure 11:
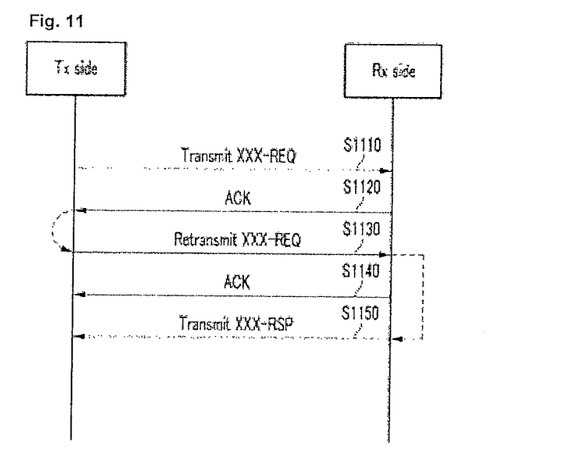

FIG. 10 and FIG. 11 respectively show a flowchart of a retransmission control method according to another embodiment of the present invention.

A request (REQ)/response (RSP)-based MAC management message performs timer-based retransmission. The request message (XXX-REQ) of the MAC management message includes a dynamic service addition (DSA) request (DSA-REQ) message, a dynamic service change (DSC) request (DSC-REQ) message, a dynamic service deletion (DSD) request (DSD-REQ) message, and a ranging (RNG) request (RNG-REQ) message. The response message (XXX-RNG) of the MAC management message includes a DSA response (DSA-RSP) message, a DSC response (DSC-RSP) message, a DSD response (DSD-RSP) message, and a RNG response (RNG-RSP) message. The MAC management message may include a message that requires no response.

Referring to FIG. 10, the transmitting side transmits the request message (XXX-REQ) and operates a response timer (S1010). An expiration time of the response timer may be differently set for each MAC management message. Also, the timer for retransmission may applicable to the request message and the response message, and may also applicable to the MAC management message requiring no response. When failing to successfully receive the request message (XXX-REQ), the receiving side transmits a NAK (i.e., NAK of HARQ scheme) to the transmitting side since it cannot provide the response message (XXX-RSP) (S1020). The transmitting side retransmits an HARQ burst for the request message (XXX-REQ) to the receiving side according to the HARQ scheme (S1030), and receives a feedback message from the receiving side (S1040).

According to the general HARQ scheme, when the transmitting side receives a NAK from the receiving side after transmitting the HARQ burst for the request message (XXX-REQ) by the HARQ maximum retransmission number, the transmitting side starts transmitting the request message (XXX-REQ) again when the response timer is expired after a predetermined standby time. That is, when the HARQ process is terminated while transmission of the request message (XXX-REQ) is not successful and the response timer is not expired, the transmitting side does not transmit the request message (XXX-REQ) again and stands by until the response timer is expired. However, since the response timer is set to be long in the MAC management message, the delay for new transmission is substantially increased.

Therefore, according to the embodiment of the present invention, when the transmitting side transmits the HARQ burst for the request message (XXX-REQ) by the HARQ maximum retransmission number and then receives a NAK from the receiving side (the maximum HARQ retransmission number is given as 1 in FIG. 10), an HARQ transmitting module transmits transmission failure to a MAC message management module of the MAC layer. The MAC message management module starts transmitting the MAC management message. That is, the MAC layer of the transmitting side does not wait for expiration of the response timer and starts transmitting the request message (XXX-REQ) again (S1050). When the MAC management message is fragmented into a plurality of messages, that is, MAC PDU and the HARQ burst includes at least one fragmented MAC PDU, the transmitting side only may retransmit the MAC PDU (i.e., fragmented MAC management message) corresponding to the transmission-failed HARQ burst. Differing from this, the transmitting side may retransmit the entire MAC management message.

When normally receiving the request message (XXX-REQ), the receiving side transmits an ACK to the transmitting side (S1060) and transmits the response message (XXX-RSP) to the transmitting side (S1070).

The transmitting side repeats the steps S1010 to S1050 until the response timer is expired or until receiving the response message (XXX-RSP), and it may repeat these steps when failing to receive the response message (XXX-RSP) after the response timer is expired.

According to another embodiment, when transmission of HARQ is failed before the response timer is expired, the transmitting side may discard the corresponding HARQ burst. When the downlink HARQ burst remains in the buffer of the receiving side after the response timer is expired, the receiving side may discard the corresponding HARQ burst after the maximum retransmission number is passed.

According to another embodiment, in the case of the request message (XXX-REQ) requiring the response message (XXX-RSP), the response timer may be expired while the transmitting side does not receive the response message (XXX-RSP) during retransmitting an HARQ burst for the request message (XXX-REQ). Also, in the case of the message requiring no response message, for example, in the case of the privacy key management (PKM) message, the response timer may be expired while the transmitting side does not receive an ACK during retransmitting the HARQ burst for the corresponding message. In these cases, the transmitting side may stop the corresponding HARQ burst's retransmitting operation and may transmit a new MAC management message.

Referring to FIG. 11, the transmitting side transmits the request message (XXX-REQ) (S1110). The receiving side successfully receives the request message (XXX-REQ) and transmits an ACK (S1120). In this case, because of the feedback error, the transmitting side may retransmit an HARQ burst for the request message (XXX-REQ) (S1130) even if it has received the ACK, and the receiving side may normally receive the HARQ burst (S1140).

As such, when the receiving side has received a plurality of request messages (XXX-REQ), the receiving side generates and transmits the response message (XXX-RSP) based on the most recently received request message (XXX-REQ) (S1150).

Since the request message (XXX-REQ) may be changed or repeatedly received during retransmission, a transaction identifier or its corresponding information may be added to the request message (XXX-REQ) and the response message (XXX-RSP) so as to identify the valid request message (XXX-REQ) and the corresponding response message (XXX-RSP). In addition, an identifier of the frame (or subframe) for transmitting the request message (XXX-REQ) may be added to the response message (XXX-RSP).

As described above, according to an embodiment of the present invention, the synchronous HARQ method and the asynchronous HARQ method can be efficiently combined and used.

In addition, according to an embodiment of the present invention, the HARQ burst can be quickly retransmitted when the HARQ burst failed to be transmitted.

Further, according to an embodiment of the present invention, fast retransmission is allowable by linking the HARQ method and the ARQ method.

Furthermore, according to an embodiment of the present invention, a MAC management message can be retransmitted quickly, and an accurate response to the MAC management message can be received.

The above-described embodiments can be realized through a program for realizing functions corresponding to the configuration of the embodiments or a recording medium for recording the program in addition to through the above-described apparatus and/or method, which is easily realized by a person skilled in the art.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method of controlling retransmission in a transmitter, the method comprising:
    transmitting a medium access control (MAC) management message to a receiver by hybrid automatic retransmit request (HARQ); and
    initiating retransmission of the MAC management message when an HARQ process is terminated with an unsuccessful transmission of the MAC management message before an expiration of a retransmission timer for the MAC management message.

2. The method of claim 1, wherein initiating the retransmission comprises initiating the retransmission of an entire MAC management message.

3. The method of claim 1, wherein, when the MAC management message is fragmented into a plurality of message fragments, initiating the retransmission comprises initiating the retransmission of a message fragment that fails in the transmission.

4. The method of claim 1, further comprising starting the retransmission timer when the MAC management message is transmitted.

5. The method of claim 1, comprising receiving a notification of a transmission failure of the MAC management message from an HARQ managing module within the transmitter when the HARQ is terminated with the unsuccessful transmission of the MAC management message.

6. The method of claim 5, wherein the HARQ managing module notifies an MAC managing module within the transmitter of the transmission failure of the MAC management message.

7. The method of claim 6, wherein the MAC managing module initiates the retransmission of the MAC management message when receiving the notification of the transmission failure of the MAC management message before the expiration of the retransmission timer for the MAC management message.

8. A method of controlling retransmission in a transmitter, the method comprising:
    performing a hybrid automatic retransmit request (HARQ) process by transmitting an HARQ burst to a receiver;
    terminating the HARQ process for the HARQ burst with unsuccessful transmission of the HARQ burst; and
    initiating transmission of an automatic retransmit request (ARQ) block corresponding to the HARQ burst as the HARQ process is terminated.

9. The method of claim 8, further comprising notifying an ARQ transmitting module of the transmitter of the termination of the HARQ process in an HARQ transmitting module of the transmitter, and
    wherein the ARQ transmitting module initiates transmitting the ARQ block.

10. The method of claim 8, wherein performing the HARQ process comprises:
    receiving an negative acknowledge (NAK) for the HARQ burst from the receiver; and
    retransmitting the HARQ burst in response to the NAK when a retransmission number of the HARQ burst does not reach a maximum retransmission number, and
    wherein the HARQ process is terminated when the NAK is received from the receiver while the retransmission number of the HARQ burst reaches the maximum retransmission number.

11. A method of controlling retransmission in a transmitter to which a resource is persistently allocated, the method comprising:
- initially transmitting a hybrid automatic retransmit request (HARQ) burst according to a persistent allocation period;
- receiving a negative acknowledge (NAK) in response to transmission of the HARQ burst; and
- retransmitting the HARQ burst by an asynchronous HARQ scheme.

12. The method of claim 11, further comprising switching to the asynchronous HARQ scheme when the NAK is received and a retransmission number of the HARQ burst reaches a maximum retransmission number.

13. The method of claim 11, wherein retransmitting the HARQ burst comprises transmitting information for transmitting the HARQ burst according to the asynchronous HARQ scheme to a receiver, and
- wherein the transmitter is a base station.

14. The method of claim 11, wherein the retransmitting the HARQ burst comprises receiving information for transmitting the HARQ burst according to the asynchronous HARQ scheme from a receiver, and
- wherein the receiver is a base station.

15. A method of controlling retransmission in a transmitter, the method comprising:
- transmitting a hybrid automatic retransmit request (HARQ) burst to a receiver according to a synchronous HARQ scheme;
- performing an operation of retransmitting the HARQ burst N times after receiving a negative acknowledge (NAK) for the HARQ burst from the receiver, wherein N is an integer greater than 1; and
- retransmitting the HARQ burst to the receiver according to an asynchronous HARQ scheme after the operation is performed the N times.

* * * * *